(No Model.)
H. L. FLINT & G. W. GREGORY.
BICYCLE CRANK SHAFT.
No. 589,709.  Patented Sept. 7, 1897.
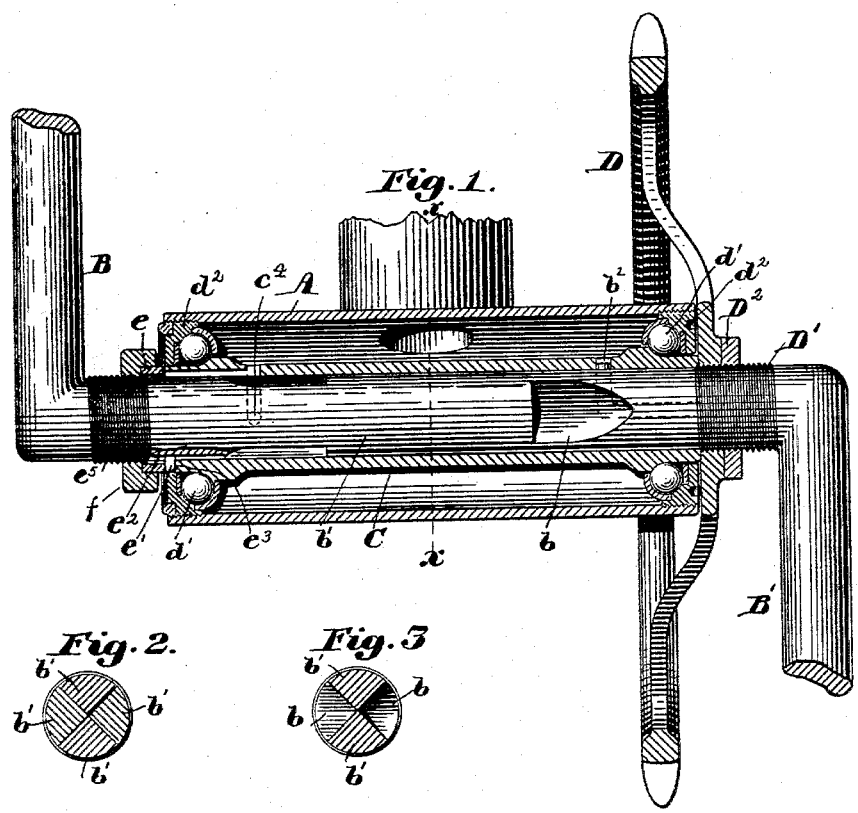
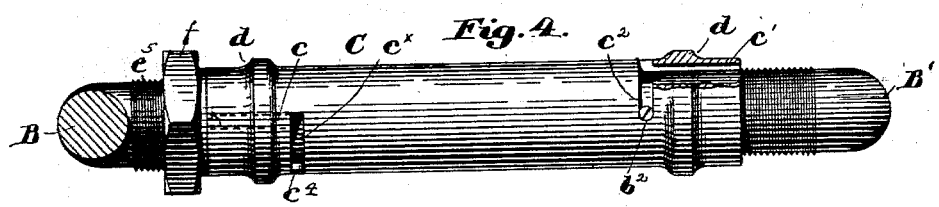
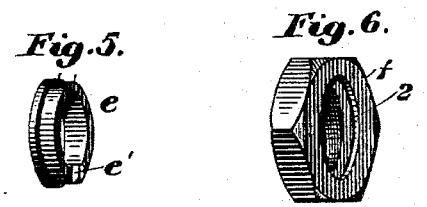
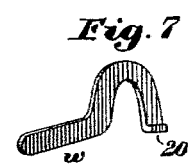
Witnesses:
Walter O. Lombard
Thomas J. Drummond
Inventors:
Herbert L. Flint,
George W. Gregory.
by Crosby & Gregory Attys.

UNITED STATES PATENT OFFICE.

HERBERT L. FLINT, OF CAMBRIDGE, AND GEORGE W. GREGORY, OF BOSTON, MASSACHUSETTS.

BICYCLE CRANK-SHAFT.

SPECIFICATION forming part of Letters Patent No. 589,709, dated September 7, 1897.

Application filed March 1, 1897. Serial No. 625,485. (No model.)

*To all whom it may concern:*

Be it known that we, HERBERT L. FLINT, of Cambridge, county of Middlesex, and GEORGE W. GREGORY, of Boston, county of Suffolk, State of Massachusetts, have invented an Improvement in Bicycle Crank-Shafts, of which the following description, in connection with the accompanying drawings, is a specification, like letters and figures on the drawings representing like parts.

The crank-shaft to be herein described is composed of two substantially like parts, one end of each part being provided with two deep parallel grooves to receive between them two prongs or fingers, the prongs or fingers of one part entering the grooves of the other part when the two parts of the crank are to be put together, and in this condition power applied to either half of the crank will turn the other half positively with it.

To prevent one part of the crank from being withdrawn from the other part longitudinally, the forked part of the shaft is surrounded by a sleeve, said sleeve being provided near each end with a bayonet-slot.

Each part of the shaft has a pin which may enter one of the bayonet-slots of the sleeve, thus loosely connecting the sleeve to the shaft, the said pins entering said slots as the prongs or fingers on one part of the shaft are made to enter the grooves on the other part in putting the crank-shaft together, and after the prongs or fingers have been fully inserted into the grooves the sleeve is partially rotated, thus causing the parts of the bayonet-slots which are at substantially right angles to the longitudinal axis of the sleeve to embrace the pins and thus lock together the two parts of the shaft and prevent the withdrawal or separation of the formed and grooved ends of the shaft. The exterior of this sleeve is provided with suitable cones or inclines, against which act a series of balls, the said balls being contained in suitable ball-bearing boxes in a hub or part of the frame of the machine.

To prevent any possible loosening or accidental partial rotation of the sleeve, which would permit the two parts of the shaft to be uncoupled by longitudinal motion, there has been added to the shaft at one end of the sleeve a sleeve-locking device, it being shown as a washer surrounding a part of the shaft and having a prong to enter a notch in the end of the sleeve, said finger also entering a longitudinal groove cut in the shaft. A suitable nut chambered at one side has been applied to the shaft to overlap the sleeve-locking device, the turning of the nut on the one part of the shaft holding the sleeve-locking device in operative position.

Figure 1, in longitudinal section, shows a bicycle-crank illustrating this invention as applied to part of a bicycle-frame. Fig. 2 shows a section through the locked forked ends of the crank on the dotted line $x$. Fig. 3 shows one of the crank ends in section. Fig. 4 is a plan view of the crank and the surrounding sleeve, showing its two slots. Fig. 5 shows the locking device for the sleeve detached. Fig. 6 shows the nut detached, and Fig. 7 shows a wrench or tool by which to turn the sleeve to lock or unlock the pins of the shaft parts to enable the said shaft parts to be locked together or to be separated.

The cylinder-hub A may be supposed to be that part of a bicycle-frame which is to receive the crank-shaft, it carrying usual pedals. (Not shown.) Herein this crank-shaft is shown as composed of two parts B B', the contiguous ends of the said parts being each grooved, as at $b\ b$, (see Fig. 3,) to leave two long prongs or fingers $b'\ b'$, each of said prongs entering one of said grooves. When the ends of the said parts are forced together, as in Fig. 1, and when so forced together and power is applied to either pedal connected with either part, the other part and its pedal will be rotated positively in unison with it without any chance whatever to slip. To hold these forked ends of the parts B B' together, so that no endwise motion whatever may occur which would separate their interlocked ends, the said forked ends of the two parts are surrounded by a sleeve C, provided near each end with a bayonet-slot, as $c\ c^x$ and $c'\ c^2$, the parts $c^x$ and $c^2$ being circumferential and substantially at right angles to the parts $c$ and $c'$. The pin $c^4$ in the part B of the crank-shaft will enter the open end of slot $c\ c^x$ when the forked part B is inserted within the sleeve. The part B' has a pin $b^2$, and when the forked end of the part B' is pushed into the opposite end of the sleeve to cause the fingers b' to enter the grooves b, pin b² will enter the part c' of the bayonet-slot c' c², and when the said forked ends are substantially fully interlocked the sleeve will be rotated partially to thus cause the parts c× and c² of said slots to embrace the pins c⁴ and b², and thereafter while the sleeve remains in that position the shaft parts B B' cannot be separated.

To so rotate the sleeve about the shaft parts that the slots may embrace the pins at opposite sides, we use a spanner w, having a finger 20, and this finger will enter the open end of either the bayonet-slot or the slot e³, and then by turning the spanner the sleeve may be turned.

The sleeve C is provided externally with two like conical or inclined surfaces d, on which rest a series of balls d', contained in a ball-holder d², formed as a circular disk suitably secured into the threaded ends of said hub A.

To prevent any possible liability of the sleeve after it has been turned to hold in locked position the forked ends from being turned in the opposite direction on the crank ends to thus leave the forked ends free to be separated, there has been added to one of the cranks a sleeve-locking device e, it being shown as a washer provided at one side with a locking-finger e', which may enter a notch e³ in the end of the sleeve after the latter has been partially rotated, as described, to cause the slots of the sleeve in engagement with the pins of the crank parts to hold the forked ends firmly together. The finger e' also enters a slot e² in the part B of the crank-shaft, so that said washer rotates with the crank-shaft, said shaft having a short threaded portion e⁵, on which is screwed a nut f, cut away at one face, as at 2, (see Fig. 6,) to embrace and contain the locking device, the rotation of the nut on the said shaft in one direction forcing the locking device into engagement with the sleeve.

The sprocket-wheel D is shown as screwed onto a threaded portion of the part B', and a locking or jam nut D² is applied to the said crank part to lock and confine the sprocket in place.

To remove the crank from the bicycle-frame it is only necessary to loosen the nut f on the part B and move it away from the hub A until sufficient space is afforded in which the washer may be moved far enough to remove its finger e' from the holding-notch e³ in the end of the sleeve. This washer having been removed, a small spanner-like wrench or tool w, (see Fig. 7,) it having at one side a finger 20 to enter the notch e³ in the sleeve, is put in position, and with the said finger 20 in the said notch the handle of the tool is turned to slightly rotate the sleeve about the shaft end until the pins c⁴ and b² are put opposite the straight part c and c' of the bayonet-slots, and thereafter the parts B and B' of the shaft may be readily pulled out from the sleeve.

The straight parts c and c' of the bayonet-slots, as herein shown, are not cut entirely through the sleeve, but appear as internal grooves in the sleeve.

Having described this invention, what is claimed is—

1. A bicycle crank-shaft composed of two parts, each part having one end grooved along its sides parallel to its axis to present prongs or fingers, having parallel longitudinal sides each having also a pin or projection, a prong or finger on one part entering a groove in the other part when the said ends are forced one into the other, a surrounding sleeve provided near its ends with grooves to receive said pins, said grooves having their inner ends extending circumferentially at right angles to the axis of the crank-shaft, the sleeve when partially turned thereby coöperating with said two pins to lock the shaft ends in engagement to prevent relative longitudinal movement of one of the shaft parts on the other shaft part, and ball-holders containing balls to coöperate with inclined or tapered surfaces on said sleeve, combined with a sprocket-wheel secured on a part of said shaft, substantially as described.

2. The combination, in a bicycle, with a stationary hub, of a crank-shaft composed of two parts, one part being grooved along its sides rearwardly from its end, and the other part having separated, distinct prongs or fingers projecting freely forward at its end, said fingers registering snugly with said grooves to interlock therewith, the two parts sliding endwise into each other and forming a tight joint whether slid into each other a long or a short distance, a surrounding sleeve having internal slots at its ends, each of said parts having a pin to enter the adjacent slot, said slots having their inner ends extended circumferentially about said sleeve, and ball-bearings formed respectively on the adjacent portions of said hub and sleeve at each end of the latter, balls therefor, and means to prevent relative rotation of said shaft and sleeve when locked together by said pins and slots, substantially as described.

In testimony whereof we have signed our names to this specification in the presence of two subscribing witnesses.

HERBERT L. FLINT.
GEO. W. GREGORY.

Witnesses:
JOHN C. EDWARDS,
ADDIE F. DANIELS.